United States Patent [19]

Baker et al.

[11] Patent Number: 5,446,357
[45] Date of Patent: Aug. 29, 1995

[54] DISCONTINUITY COMPENSATION FOR MOTOR DRIVER SERVOS

[75] Inventors: Trace A. Baker, Boulder; Bruce M. Davis; Chester L. Rebman, both of Longmont, all of Colo.

[73] Assignee: Storage Technology Corporation, Louisville, Colo.

[21] Appl. No.: 132,108

[22] Filed: Oct. 5, 1993

[51] Int. Cl.⁶ .................................................. G05B 11/18
[52] U.S. Cl. ..................................... 318/632; 318/636; 364/178
[58] Field of Search ................ 318/560, 561, 802, 809, 318/721, 715, 632, 636; 364/167.1, 177, 179, 183, 178

[56] References Cited

U.S. PATENT DOCUMENTS

| 4,701,839 | 10/1987 | McNally et al. | 318/721 |
| 5,038,090 | 8/1991 | Kawabata et al. | 318/802 |
| 5,089,757 | 2/1992 | Wilson | 318/560 |

Primary Examiner—William M. Shoop, Jr.
Assistant Examiner—John W. Cabeca
Attorney, Agent, or Firm—Duft, Graziano & Forest

[57] ABSTRACT

This improved signal discontinuity compensation method compensates for discontinuity in the relationship between motor position commands received by a motor driver, and motor current signals sent to a motor by the motor driver. A best fit approximation of the signal discontinuity is generated based on median data points which provides resistance to anomalous data points. The compensation is accomplished by adding an offset to specific motor position commands sent to the motor driver based on the best fit approximation. The offset command maximizes accuracy and control over motor motion by avoiding the motor driver's motor current signal discontinuity.

10 Claims, 3 Drawing Sheets

DISCONTINUITY COMPENSATION FOR MOTOR DRIVER SERVOS

FIELD OF THE INVENTION

This invention relates to high precision automated mechanism positioning, and in particular, to signal discontinuity compensation for motor driver servos used in high precision automated mechanism positioning.

PROBLEM

It is a problem in the field of high precision automated mechanism positioning when a motor driver produces incorrect motor current signals in response to a specific positioning command. Ideally there is a linear relationship between motor position commands received by the motor driver and motor current signals sent in response to a motor by the motor driver. A discontinuity exists in the motor current signal continuum produced by the motor driver where the linear relationship breaks down. The discontinuity is manifested as no motor signal response, or an uncontrolled signal response which can damage mechanical parts, ruin processes, and result in premature mechanical maintenance. Ultimately, the previously stated problems adversely affect customer satisfaction in the product using the servo.

Signal discontinuity is a particular problem in motor driver servos that use standard secondary source motor and motor driver components. Low cost and availability are the typical motivations for components. Low cost and availability are the typical motivations for selecting secondary source components, particularly where the cost of redesigning or custom designing satisfactory components is prohibitive. Some servos are more tolerant of signal discontinuities but no servo is immune, particularly where the discontinuity characteristics vary widely among drivers of the same manufacture. The more tolerant systems include servos where the motor is in continuous motion, or where absolute positioning and control is not critical.

Problems also exist among a variety of traditional discontinuity compensation methods. The following list reviews the more common methods. First, high bandwidth proportional control systems resist motion so that when a discontinuity is encountered, the resistance effectively pushes the motor back to a starting point prior to the discontinuous area. This method provides low precision mechanism positioning and leads to oscillation around the discontinuity due to overshooting the discontinuity. Further, where the extent of discontinuity is unknown, the motor may end up within the discontinuity. Second, integrating controller systems operate at the expense of introducing a significant operating limit cycle and making the restoring force build up as the integral of the error until the motor moves. This method also results in low precision mechanism positioning, lack of control, and possible oscillation. Third, continuously "dithering" the motor at a discontinuity point sacrifices control over positioning while adding extraneous noise to the system. This method is particularly undesirable where a necessary mechanism position lies within the discontinuity. Fourth, increasing motor demand voltage until a change is detected in the noise region is an undesirable method of measuring signal discontinuity due to the system noise and low precision mechanism positioning. Finally, least-squares regression is a popular solution to conditioning the linear relationship of position commands versus motor current demand signals. This method fails because it lacks resistance to anomalous data points that otherwise seize control of the regression and produce unreliable results. None of the approaches described above adequately compensate for signal discontinuity where high precision is desired. Implementing the method defined herein compensates for motor driver output current signal discontinuities that render an otherwise acceptable motor servo unusable.

SOLUTION

The present invention solves the above described problems and achieves a technical advance in the field of precision mechanism positioning. A best fit approximation of motor current signal discontinuities is used to accurately compensate for motor current signal discontinuities. The result is a low cost, easy to implement method to achieve a continuous distribution of motor current signals that is resistant to anomalous data points, immune to additional noise in the servo, and highly precise in its ability to compensate for signal discontinuities. Further, implementing this method in a motor position microprocessor is a cost effective alternative to redesigning or custom designing a satisfactory motor driver and a defensive design step that protects against the varying degrees of signal discontinuity found in standard secondary source motor and motor driver components. Finally, the present invention can compensate for multiple discontinuities, its implementation is device independent, and it allows slowing, stopping or starting motor motion without concern for having stopped the motor within a discontinuity, thereby inhibiting motor control.

The present invention operates in two main phases: servo initialization and servo operation. Servo initialization is further divided into two processes which are executed any time the host system is powered up or upon request. First, data points are collected indicative of motor current signals produced by the motor driver in response to motor position commands. Second, the data points are processed to locate and condition motor current signal discontinuities by a best fit approximation. A three-group resistant line regression is the preferred method due to its median point calculations which provide anomalous data point resistance.

Servo operation is primarily the adding of an offset to the motor position commands where compensation is required to avoid motor current demand signal discontinuities. The offset can also be used to shift the entire signal distribution as well as compensate for signal discontinuities. Sending compensated position commands to the motor driver results in precise control of motor motion.

DETAILED DESCRIPTION

Motor Driver Servo Architecture

Figure 1:
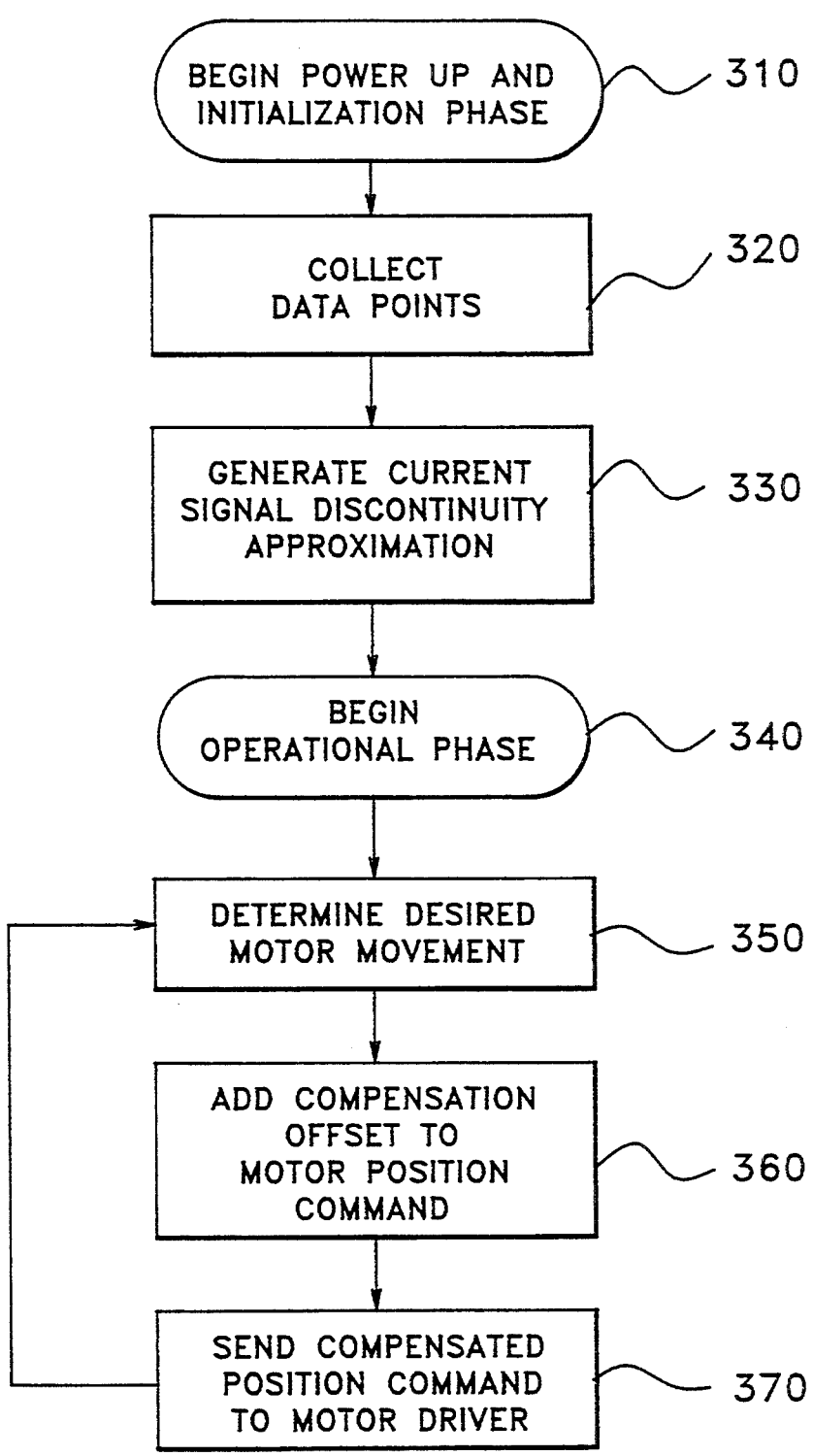
FIG. 1 illustrates the servo initialization and servo operational overview in block diagram form.
Figure 3:
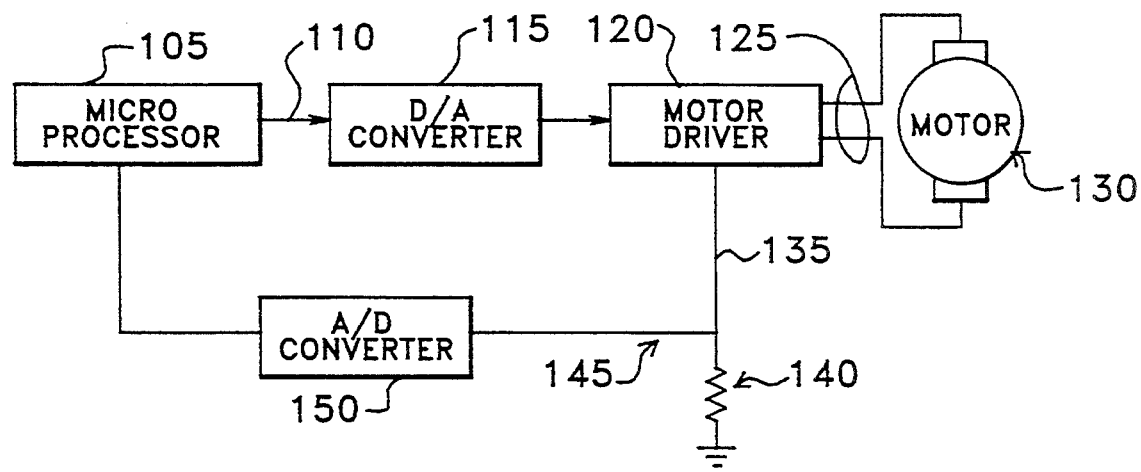
FIG. 3 illustrates a basic motor driver servo architecture in the prior art.
Figure 2:
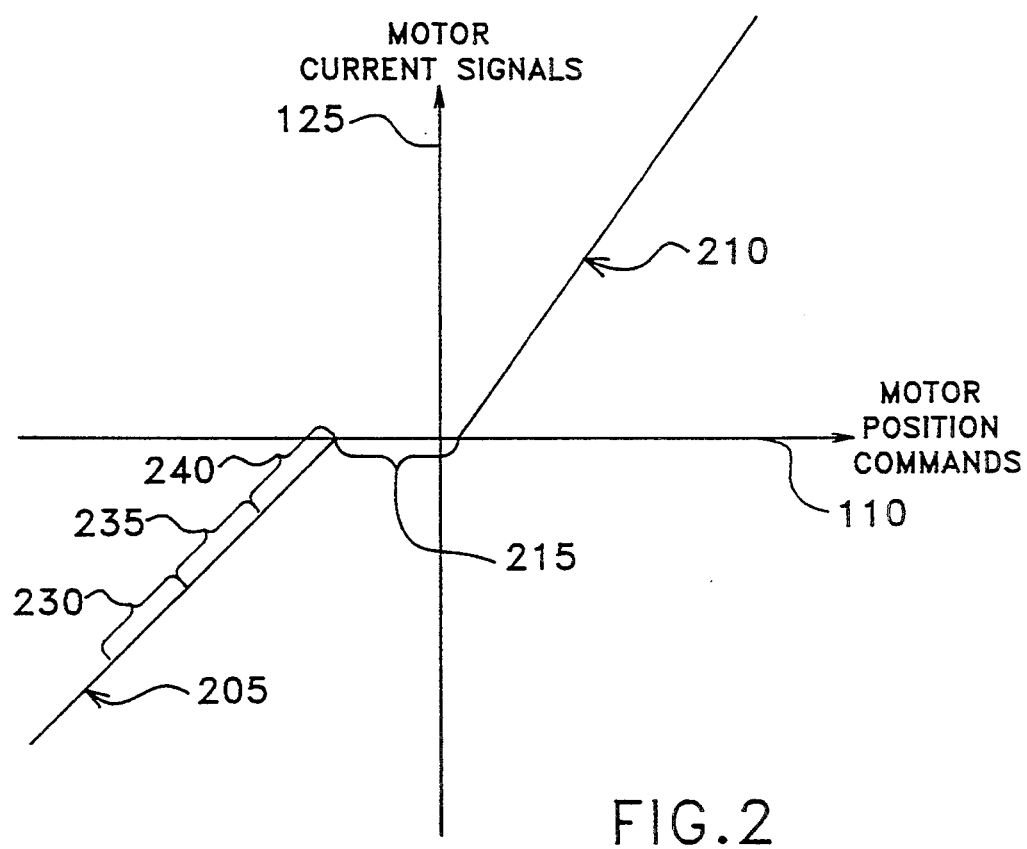
FIG. 2 illustrates a signal discontinuity in a motor position command versus motor current signal relationship.
Figure 4:
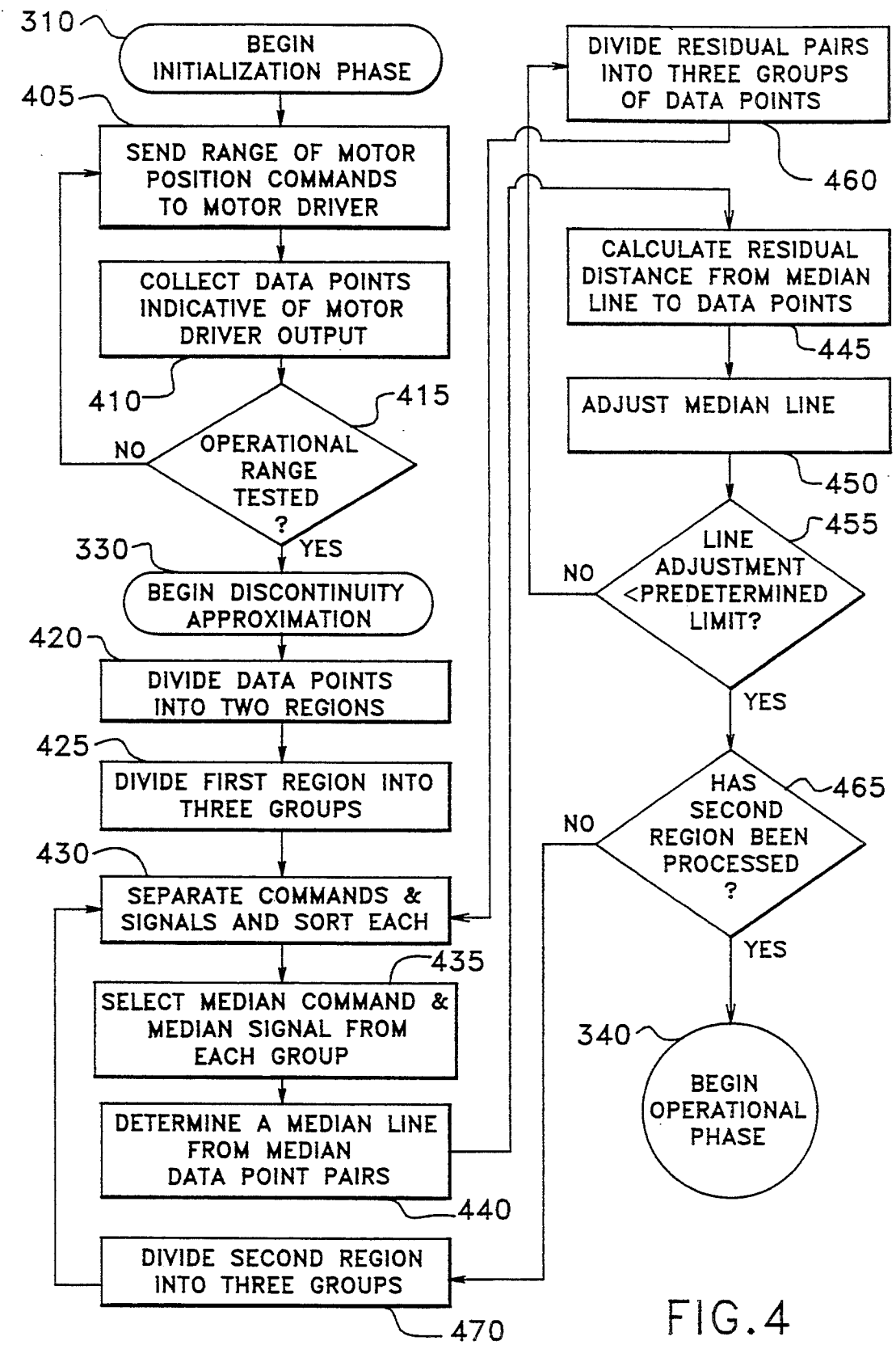
FIG. 4 illustrates the servo initialization phase details in block diagram form.

FIG. 3 illustrates a basic motor driver servo architecture common in the prior art. The motor position microprocessor 105 determines the timing and extent of desired motor positions and sends the appropriate position commands 110 to the motor driver 120 following analog conversion 115. The motor driver 120 interprets the position command 110 and produces the appropriate motor current signal 125 which controls the motor 130. The servo feedback includes a current signal intercept 135 and current sense resistor 140. The current sense signal 145 is converted 150 and forwarded to the motor position microprocessor 105.

Process Overview

Two main process divisions include servo initialization 310 and servo operation 340. Servo initialization 310 is further divided into two processes. First, motor current signals 125 and 145 produced by the motor driver 120 are collected and stored as data points with the corresponding motor position command 110 for subsequent processing as seen in 320 FIG. 1 and 405-415 FIG. 4. Second, the stored data points are processed to locate and condition motor current signal discontinuities as seen in 330 FIG. 1 and 420-470 FIG. 4. Each time the motor driver servo's host system is powered up 310 or a predetermined level of reinitialization is requested, the motor driver servo repeats its initialization steps in preparation for operation.

Servo operation 340 is primarily adding an offset to the motor position commands 350 and 360 where compensation is required to avoid discontinuities. Where no discontinuity exists, no compensation is added to the motor position commands 370. However, an offset may be added to each motor position command to shift the entire range of commands in a linear or non-linear fashion in addition to compensating for discontinuities.

Servo Initialization Details

The motor position microprocessor 105 controls initialization operations 310. First, the microprocessor sends a predetermined arrangement of motor position commands 405 as a stimulus to the motor driver 110. Second, for each motor position command stimulus 405 a corresponding motor current signal response 410 is expected from the motor driver through the feedback loop 135-145. The completed feedback loop includes a current signal intercept 135 which carries a motor current signal response 410 in voltage signal form 145 to the motor position microprocessor 105. Third, the microprocessor records each motor position command and motor current signal response as a data point 410. The accuracy of subsequent processing results is proportional to the number of data points collected.

Ideally there is a linear relationship 205 and 210 between motor position commands 110 received by the motor driver 120 and motor current signals 125 sent to the motor 130 by the motor driver 120. A discontinuity 215 exists where the linear relationship breaks down due to a motor driver's failure to respond appropriately to a motor position control stimulus 110. The preferred steps, shown in FIG. 4 at 330, accurately locate and condition a new linear relationship thereby avoiding discontinuities while resisting anomalous data points that would otherwise adversely affect the results. The method is known as a three group resistant line that is a regression in the broadest sense that it is a robust method of yielding a fitted line or curve from a larger set of data. For a complete description of the theory behind this method see John D. Emerson & David C. Hoaglin, Resistant Lines For y versus x, in Understanding Robust Statistics and Exploratory Data Analysis, 129-140 (David C. Hoaglin, et al. eds., John Wiley & Sons, 1983).

The stored data points are divided into a first region 205 and second region 210 on opposing ends of a discontinuity 215. Each region is subsequently processed individually and independent of which region is processed first; this discussion begins with the first region 205. The first region 205 data points are divided into three adjacent groups of group one 230, group two 235, and group three 240. Each group is further subdivided and sorted in ascending order by data point components 430. Specifically, each data point has two components: 1) a motor position command component 110; and 2) a corresponding motor current signal component 125. A median command component 110 and median signal component 125 are independently selected from each group 230, 235, and 240 as seen in 435. The resulting median data point in each group 230, 235, and 240 need not be an original data point. Most important is that the larger the number of data points in each group, the more the resulting line will be resistant to anomalous data points.

A new slope and intercept, called the median slope and intercept, is calculated from the median data points 440. The slope is determined from the group one 230 and group three 240 median data point components. The intercept is an average of the motor current signal intercepts obtained for each of the three groups 230, 235, and 240, using the previously calculated slope. A further refinement over the intercept average is to use a central motor current signal value in place of the intercept average. It is the use of median data points and averaging that provides the resulting line accuracy and resistance to anomalous data points.

The median slope and intercept are used to determine a "residual" distance 445 between a motor current signal and a median current signal approximation that is calculated as a function of the median slope and intercept for each motor position command. For each residual, a new data point pair is created from a motor position command and a corresponding residual. When all motor position commands are paired with a residual, the median line's slope and intercept is adjusted accordingly 450. If the adjustment is less than a predetermined percent limit 455, then the second region 210 data points are processed beginning at 470. If the adjustment is not less than a predetermined percent limit 455, the new data points, now containing a residual as the motor current signal component, are processed in another iteration beginning at 460.

Additional iterations of the initialization phase calculations may be completed for as many discontinuities as exist in the motor position command versus motor current signal relationship. Similarly, the first region 205 and second region 210 may be adjusted independently as a specific application dictates. Finally, the above defined initialization steps are applicable to linear or curvilinear relationships defined with cartesian, polar, or other multidimensional coordinate systems.

Operational Phase

The operational phase 340 follows servo initialization 310 and continues as an infinite loop. As the motor position microprocessor 105 determines what motor position is desired, an appropriate discontinuity compensation offset is added to the specific motor position command(s) 360 necessary to avoid the discontinuity. Where no discontinuity exists, no compensation is added to the motor position command 370 sent to the motor driver 120. However, an offset may be added to each motor position command to shift the entire range of commands in a linear or non-linear fashion in addition to compensating for discontinuities as called for in a specific application. Sending compensated position commands to the motor driver results in precise control of motor motion.

Example Of Operation

One application of the present invention is a tape threading mechanism in an automated tape storage system using 3480-type magnetic tape cartridges. Automated tape storage system users demand short response times between a request for data and the system's ability to provide the data access. Minimum tape threading time is a significant factor in the overall tape mounting process facilitating short response times. Providing maximum mechanical component reliability is another important factor in a satisfactory automated tape storage system. The present invention provides complete control over motor speed and motor direction independent of the variety of signal discontinuities existing in a variety of secondary source motor driver's used to manufacture the tape threading system. Implementing the invention in a motor position microprocessor minimizes tape threading delays by assuring first attempt threading component alignment and maximizes mechanical component reliability by reducing component stress or possible jamming due to misalignment. Further, the present invention is a negligible additional design cost compared to the cost of custom or redesigned components, or the loss of accuracy and control over a motor.

Summary

Motor driver servos similar to FIG. 3 have a motor driver 120 which sends motor current signals 125 that controls a motor 130. Ideally there is a linear relationship between motor position commands 110 instructing a motor driver 120 as to the desired motor motion, and motor current signals 125 sent to a motor 130 by the motor driver 120. A discontinuity 215 exists where the linear relationship between position commands 110 and current signals 125 breaks down. The result is a lack of accuracy and control over the motor 130 motion. The present invention compensates for signal discontinuity 215 by generating a best fit approximation of the discontinuity based on median data points in a method that is resistive to anomalous data points. The approximation identifies a new relationship between motor position commands 110 and motor current signals 125 so that the discontinuity 215 is avoided. The compensation is accomplished by adding an offset to specific motor position commands 110 sent to the motor driver 120 based on the best fit approximation. The offset command maximizes accuracy and control over motor motion by avoiding the driver's motor current signal discontinuity.

While a specific embodiment of this invention has been disclosed, it is expected that those skilled in the art can and will design alternate embodiments of this invention that fall within the scope of the accompanying claims.

We claim:

1. A method for compensating for a discontinuity of motor current signals in a motor driver servo having a motor position microprocessor, a motor driver, a motor, a means for receiving a plurality of motor position commands by said motor driver, and a means for sending a plurality of motor current signals to said motor from said motor driver, said method comprising the steps of:
   (a) collecting data indicative of a correspondence between said plurality of motor position commands and said plurality of motor current signals;
   (b) generating a best fit approximation of said plurality of motor position commands around said discontinuity of motor current signals; and
   (c) compensating for said discontinuity of motor current signals by adding an offset based on said best fit approximation to at least one selected command among said plurality of motor position commands.

2. The method of claim 1 wherein said step of collecting data includes:
   (a) generating said plurality of input commands spanning an operational range of said motor driver; and
   (b) storing data indicative of said plurality of motor current signals resulting from said plurality of motor position commands.

3. The method of claim 1 wherein said step of generating a best fit approximation comprises:
   (a) dividing said data into a first region and a second region, said first region and said second region on opposing ends of said discontinuity;
   (b) dividing said first region into equal and adjacent groups of a first group a second group and a third group;
   (c) selecting a median data point from said first group, said second group, and said third group;
   (d) calculating a median line having a slope and an intercept based on said median data point from said first group, said second group, and said third group;
   (e) calculating a residual distance from said median line to said data;
   (f) adjusting said slope of said median line by said residual distance;
   (g) repeating steps (b) through (f) on said residual distance until reaching a predetermined adjustment percent limit; and
   (h) repeating steps (b) through (g) on data in said second region.

4. A method for compensating for a discontinuity of motor current signals in a motor driver servo having a motor position microprocessor, a motor driver, a motor, a means for receiving a plurality of motor position commands by said motor driver, and a means for sending a plurality of motor current signals to said motor from said motor driver, said method comprising the steps of:
   (a) collecting data indicative of a correspondence between said plurality of motor position commands and said plurality of motor current signals;
   (b) generating a best fit approximation of said plurality of motor position commands around said discontinuity of motor current signals by linear regression resistive of anomalous data points; and
   (c) compensating for said discontinuity of motor current signals by adding an offset based on said best fit approximation to each of said plurality of motor position commands plus adding an offset to at least one selected command among said plurality of motor position commands.

5. The method of claim 4 wherein said linear regression resistive of anomalous data points is a three-group resistant line.

6. Apparatus for compensating for a discontinuity of motor current signals in a motor driver servo having a motor position microprocessor, a motor driver, a motor, a means for receiving a plurality of motor position commands by said motor driver, and a means for sending a plurality of motor current signals to said motor from said motor driver, said apparatus comprising:

(a) means for collecting data indicative of a correspondence between said plurality of motor position commands and said plurality of motor current signals;

(b) means for generating a best fit approximation of said plurality of motor position commands around said discontinuity of motor current signals; and (c) means for compensating for said discontinuity of motor current signals by adding an offset based on said best fit approximation to at least one selected command among said plurality of motor position commands.

7. The apparatus of claim 6 wherein said collecting data includes:

(a) means for generating said plurality of input commands spanning an operational range of said motor driver; and (b) means for storing data indicative of said plurality of motor current signals resulting from said plurality of motor position commands.

8. The apparatus of claim 6 wherein said generating a best fit approximation comprises:

(a) means for dividing said data into a first region and a second region, said first region and said second region on opposing ends of said discontinuity;

(b) means for dividing said first region into equal and adjacent groups of a first group a second group and a third group;

(c) means for selecting a median data point from said first group, said second group, and said third group;

(d) means for calculating a median line having a slope and an intercept based on said median data point from said first group, said second group, and said third group;

(e) means for calculating a residual distance from said median line to said data;

(f) means for adjusting said slope of said median line by said residual distance;

(g) means for repeating steps (b) through (f) on said residual distance until reaching a predetermined adjustment percent limit; and (h) means for repeating steps (b) through (g) on data in said second region.

9. Apparatus for compensating for a discontinuity of motor current signals in a motor driver servo having a motor position microprocessor, a motor driver, a motor, a means for receiving a plurality of motor position commands by said motor driver, and a means for sending a plurality of motor current signals to said motor from said motor driver, said apparatus comprising:

(a) means for collecting data indicative of a correspondence between said plurality of motor position commands and said plurality of motor current signals;

(b) means for generating a best fit approximation of said plurality of motor position commands around said discontinuity of motor current signals by linear regression resistive of anomalous data points; and (c) means for compensating for said discontinuity of motor current signals by adding an offset based on said best fit approximation to each of said plurality of motor position commands plus adding an offset to at least one selected command among said plurality of motor position commands.

10. The apparatus of claim 9 wherein said linear regression resistive of anomalous data points is a three-group resistant line.

* * * * *